May 27, 1969   A. REITZ   3,445,885
FISH-HOLDING DEVICE
Filed Nov. 17, 1966

INVENTOR.
ALBERT REITZ
BY Drummond & Cahill
ATTORNEYS

United States Patent Office 3,445,885
Patented May 27, 1969

3,445,885
FISH-HOLDING DEVICE
Albert Reitz, Tucson, Ariz.
(Rte. 1, Box 64, Coolidge, Ariz. 85228)
Filed Nov. 17, 1966, Ser. No. 595,204
Int. Cl. A22c 25/08
U.S. Cl. 17—70           1 Claim

ABSTRACT OF THE DISCLOSURE

A table for cleaning fish having a clamp member located at one end of the table to engage the tail of the fish, a pair of spring-loaded elongate shafts having outwardly turned ends which can be inserted within the fish's mouth to engage therein and, in turn, being carried by an upstanding member which is adjustably positionable on the table to accommodate fish of various lengths.

---

This invention relates to apparatus useful in the preparation of food. In particular, the invention concerns a fish-holding device.

In a further aspect, the invention relates to a fish-holding depice particularly adapted for immobilizing fish during the normal cleaning operations of scaling, skinning and other steps as are required to prepare the fish for eating.

In another aspect, the invention concerns a fish-holding device of the type above described which is conveniently and readily adjustable to accommodate various lengths of fish.

In yet another aspect, the invention concerns a fish-holding device which is simple, compact, and highly portable.

Fish cleaning is a tedious and laborious task. Fish, by their general nature, are ordinarily covered with scales and a layer of slime. At the onset, this makes the fish exceedingly difficult to grasp. As the cleaning operation progresses, deposits of scale and slime soon cover the hands of the person cleaning the fish, adding substantially to the difficulties encountered when holding the fish. Concurrently, the person cleaning the fish can no longer maintain a proper grasp upon knives, scalers, and other fish-cleaning instruments, thereby creating a potentially hazardous situation in which the fish cleaner may injure himself with a sharp portion of one of the cleaning tools.

Fish are normally cleaned in a variety of manners depending upon the species of the fish and the desires of the person cleaning the fish. Smaller fish such as trout or bluegill are normally only scalded and the entrails removed. In cleaning larger fish such as bass or pike, the skin with scales intact is first sliced away before filleting off the meat, leaving the tail, head, bone structure, and entrails intact. Still other varieties of fish are cleaned in other ways. Catfish, for example, are skinned in a manner analogous to that of skinning small animals.

Prior art devices are concerned primarily with only the removal of scales from fish, whereupon the fish need only be secured by the tail. Obviously, in these devices no provision is made for immobilizing the body of the fish to facilitate the other cleaning operations such as filleting and removing the entrails. Those few prior art devices which do provide for the immobilization of the body of the fish are complicated devices, expensive to manufacture and ungainly to operate and often fail to provide suitable means by which the device may be expediently adjusted to accommodate fish of various lengths.

It would be highly advantageous, therefore, to provide a suitable fish-holding device which would accommodate fish of varying lengths to be cleaned in a variety of manners, either at a site adjacent the fishing location or later at a removed location.

Accordingly, it is a principal object of the present invention to provide a fish-holding device for immobilizing the body of a fish.

Still another object of the invention is the provision of a fish-holding device which can be conveniently and readily adjusted to accommodate fish of various lengths.

Still another object of the invention is the provision of a fish-holding device of the above type which is simple, compact, and highly portable.

These and other objects and advantages of the present invention will become apparent to those skilled in the art from the following detailed description of the invention taken in conjunction with the drawings in which.

Briefly, in accordance with my present invention, I provide a substantially elongated base plate having a tail end and a head end. A clamp having a pair of opposing toothed jaws is affixed to the tail end of the base plate and extends toward the head end. A spring disposed within the clamp maintains the jaws in a normally closed position. The clamp is secured to the base plate with a U-joint type arrangement whereby the clamp is allowed a limited degree of movement vertically and laterally but is restrained from longitudinal movement with respect to the base plate.

An upright arm extending both above and below the base plate is slidably engaged within a slot extending a portion of the head end of the base plate. A pair of pins are secured perpendicularly through the arm parallel to the base plate and respectively above and below the upper and lower surfaces of the base plate. Pivotally attached to the uppermost end of the arm is a tension spring extending longitudinally of the base plate toward the tail end. A V-shaped, spring steel member having a spring coil turn at its apex, analogous to a torsion spring with extended legs, is secured to the free end of the tension spring. The legs, or shafts, of the aforementioned V-shaped member extend longitudinally along the base plate toward the tail end thereof. Diametrically opposed outwardly projecting end portions extend from each of the aforementioned shafts.

A U-shaped channel member encases the lateral edge of the head end of the base plate to retain the arm within the slot. A rigid wire support is pivotally attached to the vertical face of the U-shaped channel, extending downwardly therefrom a given distance to a rounded apex, then upwardly to abut the undersurface of the base plate.

Figure 1:
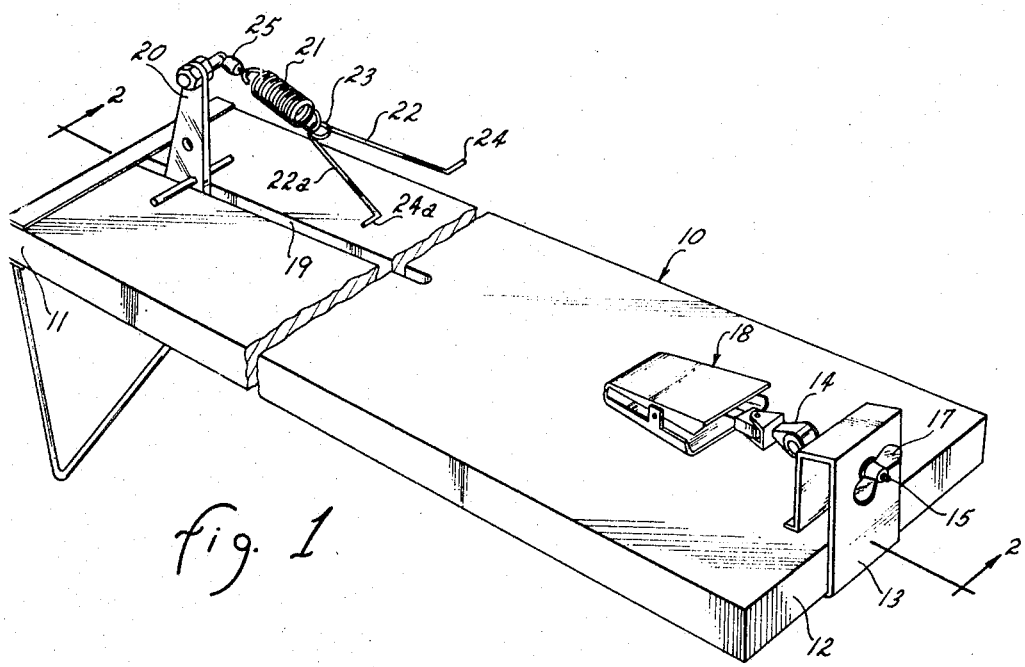
FIG. 1 is a perspective view of the device chosen for purposes of illustrating the presently preferred embodiment of the invention as the device would appear when ready for use.

Turning now to the drawings in which the same reference numerals indicate corresponding elements throughout the several views, FIG. 1 illustrates a presently preferred embodiment of the invention chosen for purposes of illustration. First provided is a generally elongate base plate 10 having a head end 11 and a tail end 12. A formed bracket 13 frictionally engages or otherwise is secured to the tail end 12 of the base plate 10 and extends vertically upward therefrom. A U-joint arrangement 14 having a rearward projecting threaded shaft 15 extending through the bracket 13 is secured thereto by a wing nut 17. A clamp 18 depends forwardly from the U-joint 14.

A vertical slot 19 longitudinally traverses a portion of the head end 11 of the base plate 10. A vertical elongate arm 20 is slidably engaged within the slot 19. A swivel union 25 is affixed at one end to the upper end of the elongate arm 20. A tension spring 21 is secured to the other end of the swivel union 25. A pair of shafts 22 and 22a integral with a coil spring 23 is secured to the free end of the tension spring 21 by engagement of the coil spring 23 with the tension spring 21. A pair of diametrically opposed, outwardly extending end portions 24 and 24a are located respectively at the terminus of each of the shafts 22 and 22a.

Figure 2:
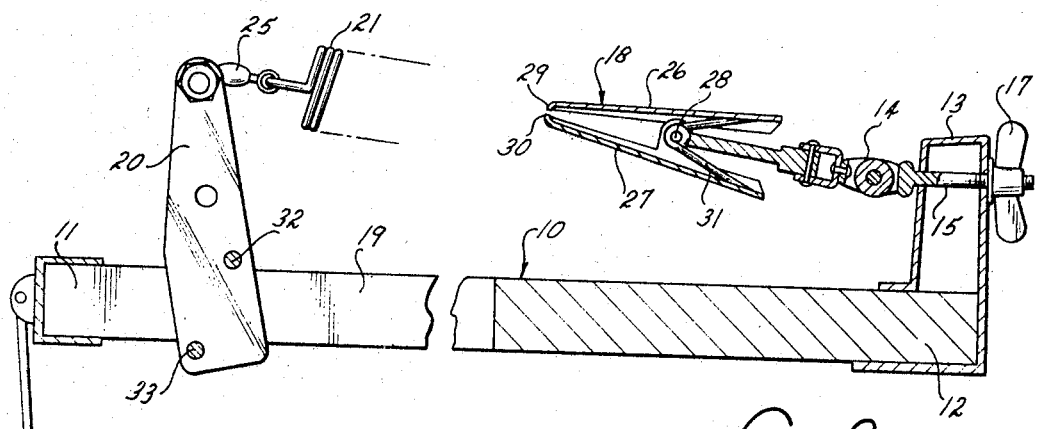
FIG. 2 is an elevational view in section taken along the line 2—2 of FIG. 1 and further illustrating the operative relationship of the components of the invention.

Attention is now directed to FIG. 2 which further discloses operative details of the device of the present invention. First noted is the clamp 18. A pair of spaced plates 26 and 27 are connected by a pivot 28. A pair of pivots 28 (not herein expressly shown but to be understood by those skilled in the art) are arranged one on either side of the clamp 18. Flanges 29 and 30 depend inwardly from the plates 26 and 27 to form a pair of mutually opposed jaws. A torsion spring 31 is disposed within the clamp 18 and exerts outward pressure upon the rear edges of the plates 26 and 27 to maintain the flanges 29 and 30 in a normally closed or gripping position.

A pair of pins 32 and 33 perpendicular to the slot 19 and parallel to the base plate 10 is secured transversely through the arm 20.

Figure 3:
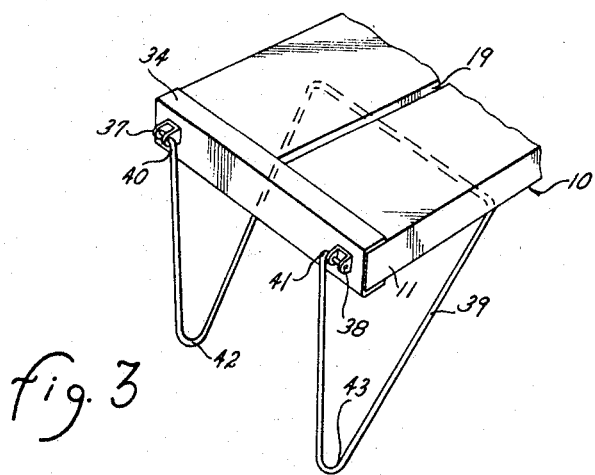
FIG. 3 is a partial perspective view of one end of the invention illustrating an elevating support means for use with the invention.

FIG. 3 illustrates an elevation means useful in supporting an end of the base plate 10. A U-shaped channel member 34 encompasses the lateral edge of the head end 11 of the base plate 10. A pair of flanges 37 and 38 extend outwardly from the vertical face of the channel member 34. A one-piece formed wire support 39 has its free ends 40 and 41 pivotally journaled within the flanges 37 and 38. The wire support 39 extends from the free ends 40 and 41 generally downward to rounded apexes 42 and 43, then upwardly to abut the undersurface of the base plate 10.

In operation, finger pressure is exerted upon the rear portions of the plates 26 and 27 of the clamp 18, thereby opening the clamp. When finger pressure is released, the spring 31 urges the toothed flanges 29 and 30 together, thereby securing the fish tail between the flanges. Finger pressure is now exerted upon the shafts 22 and 22a, compressing them together for insertion into the mouth of a fish. After insertion, finger pressure is released, allowing the spring 23 to urge the shafts apart and engaging the end portions 24 and 24a within the mouth of the fish. The arm 20 is now drawn toward the head end of the base plate 10 expanding the tension spring 21. When the arm 20 is released, the tension spring 21 tends to rotate the upper end of the arm toward the tail end of the base plate 10. The pins 32 and 33 resist this rotation and thereby retain the arm 20 at substantially the position in which it was released. The fish is now under spring tension with its body immobilized and firmly positioned for the ensuing cleaning operation.

Various changes in the device herein chosen for purposes of illustration will readily occur to persons skilled in the art. Such modifications and variations, while not explicity denoted in the foregoing detailed specification, do not deviate from the teachings of the present invention, and are intended to be included in the spirit and scope thereof.

Having fully described and disclosed the invention and what I conceive to be the presently preferred embodiment thereof in such a manner as to enable those skilled in the art to understand and practice the same, I claim:

1. A fish-holding device, particularly adapted for immobilizing the fish during the scaling, skinning, filleting, and other cleaning operations and further adapted to readily accommodate fish of various lengths, said device comprising:
   (a) a substantially elongate base plate having a tail end and a head end;
   (b) a clamp affixed to the tail end of said base plate and extending towards said head end;
   (c) a pair of shafts having diametrically opposed outwardly extending end portions, said shafts extending longitudinally toward said tail end;
   (d) spring means for urging the end portions of said shafts apart, said shafts being adapted to be compressed together for insertion into the mouth of a fish and thereafter to spread apart to engage the end portions thereof within the mouth; and
   (e) means for adjusting the longitudinal position of said shafts along a portion of the head end of said base plate, said means for adjustment comprising:
      (1) a vertical elongate arm slidably engaged within and extending through a longitudinal slot in said base plate;
      (2) a pair of spaced pins perpendicular to said slot and parallel to said base plate extending transversely through said arm, one of said pins spaced above said base plate and the other of said pins spaced below said base plate; and
      (3) tension spring means extending between the upper end of said arm and said shafts.

References Cited

UNITED STATES PATENTS

| 1,259,109 | 3/1918 | Kugler et al. | 17—8 |
| 1,632,194 | 6/1927 | Possehl | 17—8 |
| 2,680,877 | 6/1954 | Thornton | 17—8 |
| 3,248,751 | 5/1966 | Wilborn | 17—8 |

LUCIE H. LAUDENSLAGER, *Primary Examiner.*

U.S. Cl. X.R.

23—122